United States Patent [19]

Woodhouse

[11] Patent Number: 4,789,448
[45] Date of Patent: Dec. 6, 1988

[54] DEVICE FOR CONTROL OF SCALE FORMATION

[76] Inventor: Derek A. Woodhouse, 48 Moathouse Drive, Haughton, Stafford, England

[21] Appl. No.: 822,025

[22] Filed: Jan. 24, 1986

[30] Foreign Application Priority Data

Jan. 28, 1985 [GB] United Kingdom ............... 8502078

[51] Int. Cl.[4] ...................... C25B 9/04; C25B 15/08; C25B 11/04
[52] U.S. Cl. .................................. 204/228; 204/272; 204/275; 204/286; 204/291; 204/DIG. 5
[58] Field of Search ................. 204/148–149, 204/197, 232, 228, 248, 272, 155, DIG. 5, 271, 291, 242, 275, 286

[56] References Cited

U.S. PATENT DOCUMENTS

| | | | |
|---|---|---|---|
| 966,025 | 8/1910 | Lautzenhiser et al. | 204/149 |
| 1,159,699 | 11/1915 | Murdock | 204/272 X |
| 2,490,730 | 12/1949 | Dubilier | 204/272 X |
| 2,652,925 | 9/1953 | Vermeiren | 204/DIG. 5 X |
| 2,939,830 | 6/1960 | Green et al. | 204/248 |
| 3,342,712 | 9/1967 | O'Keefe, Sr. | 204/248 X |
| 3,425,925 | 2/1969 | Fleischman | 204/248 X |
| 3,522,162 | 7/1970 | Davies | 204/149 X |
| 3,637,482 | 1/1972 | Vajda | 204/272 X |
| 3,835,018 | 9/1974 | Casanovas et al. | 204/228 |
| 3,873,434 | 3/1975 | King | 204/150 X |
| 3,919,068 | 11/1975 | Gary | 204/248 X |
| 3,928,155 | 12/1975 | Woodhouse | 204/150 |
| 4,014,766 | 3/1977 | Watanabe et al. | 204/149 X |
| 4,119,518 | 10/1978 | Miller | 204/292 X |
| 4,525,253 | 6/1985 | Hayes et al. | 204/271 |
| 4,525,272 | 6/1985 | Henson | 204/228 X |
| 4,552,664 | 11/1985 | Benner | 204/DIG. 5 X |
| 4,606,828 | 8/1986 | Wells | 204/150 X |
| 4,623,436 | 11/1986 | Umehara | 204/149 |

Primary Examiner—Donald R. Valentine
Attorney, Agent, or Firm—W. Thad Adams, III

[57] ABSTRACT

A device for countering the deposition of hard water scale comprises a cathode and an anode defining a passage for water passing through the device and connected in an electrical circuit including the water as an electrolyte. The anode is a sacrificial anode which releases salt particles and ions into the water during operation of the device. At least a substantial proportion of such particles and ions are non-adherent to the anode, and thereby form sites for crystal formation in the water and reduce deposition of scale. An external electrical potential may be applied across the circuit to cause an externally generated current to pass through the device. Means may be provided for generating a magnetic field downstream of the anode and cathode.

16 Claims, 4 Drawing Sheets

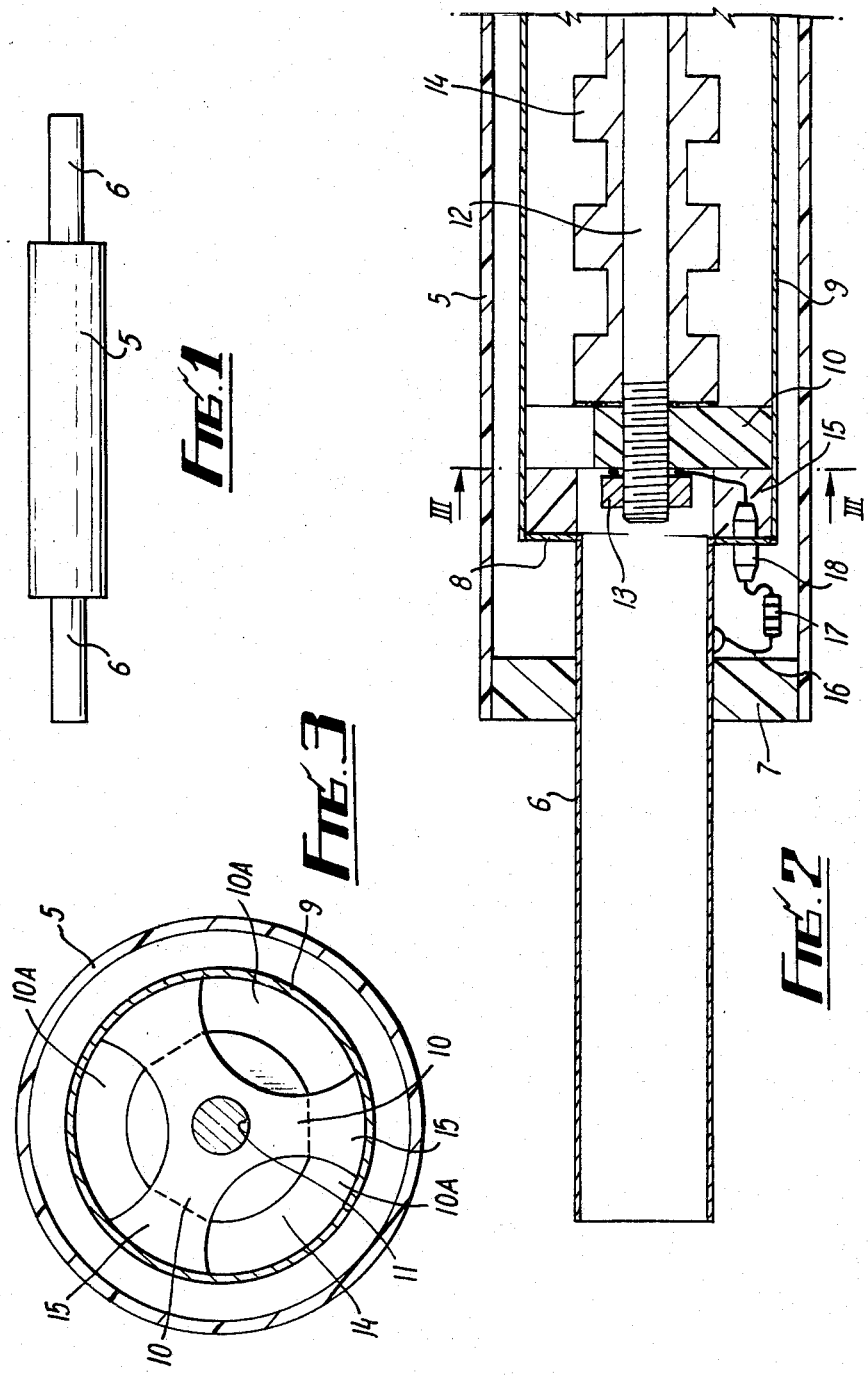

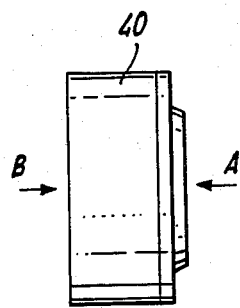
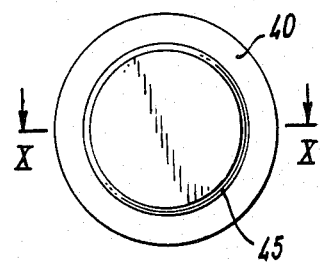
FIG.8  FIG.9
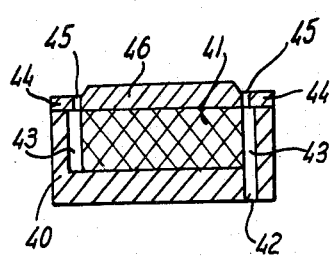
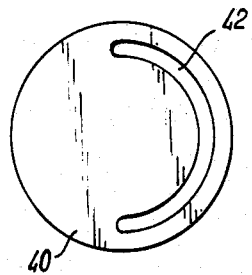
FIG.10  FIG.11

DEVICE FOR CONTROL OF SCALE FORMATION

This invention relates to methods and means for countering the deposition of hardwater scale in containers or on the inner surfaces of conduits or apparatus in which the water is contained or through which it flows.

To prevent the deposition of scale it has previously been proposed to constrain scale forming particles to remain in suspension in the water thus preventing them forming deposits on surfaces and hence reducing scale formation. The presence of electric fields affects the formation or crystals and precipitates and their subsequent behaviour and British Patent Specification No. 1288552 discloses the use of an electrolytic current consuming cell for this purpose, the cell having a copper cathode and a stainless steel anode and using the hard water as the electrolyte. Such devices produce satisfactory results under many circumstances but their effectiveness has been found to deteriorate in time and this is believed to be due to chemical reactions at the surface of the stainless steel anode changing the surface composition and modifying the interfacial electrochemical potential between the electrode and the hard water so that the electrolytic current consuming cell no longer functions. Under some circumstances of use, after a period of operation the stainless steel becomes cathodic. Under these circumstances the change in the surface chemistry of the electrodes leads to a situation in which the potential difference between the two electrodes drops to a level where no current flows in the cell. Similar problems arise using other metals due to passivating oxide films forming on the anode, and it is an object of the present invention to provide an improved form of device of this general kind in which these disadvantages are obviated or mitigated.

According to one aspect of the invention there is provided a device for treating hard water to counter the deposition of scale comprising an anode and a cathode spaced apart to define a passage through which water to be treated passes during operation of the device, said anode and cathode being connected in an electrical circuit externally of the water and including the water as an electrolyte, the anode being a sacrificial anode which releases negatively charged salt particles and ions into the water during operation of the device, at least a substantial proportion of such particles and ions being non-adherent to the anode and cathode and thereby forming sites in the water for formation of crystals of scale forming impurities which remain in suspension in the water thereby reducing deposition of scale on the surfaces of vessels, pipes or the like into or through which the water subsequently flows.

Preferably the anode is composed of a metal which is non-toxic, forms an amphoteric hydroxide in aqueous solution, and is sufficiently separated on the galvanic scale from the cathode metal to form an electrolytic current consuming cell. These requirements are met by a zinc anode combined with a copper cathode.

Where the anode comprises zinc, the zinc is preferably of high purity, that is in excess of 99% pure. Preferably the anode is arranged to have a mass loss rate of less than $10 \times 10^{-6}$ grammes/hour.

In one form of the device the anode comprises a series of rings spaced apart axially of the device and defining a central passage for flow of water therethrough, the cathode comprising a tube surrounding said rings but electrically insulated therefrom other than by way of said electrical connection.

In an alternative arrangement the anode comprises a bar of castellated form around which the water flows during its passage through the device, the castellated bar presenting a substantial surface area to the water and the cathode comprising a tube surrounding said bar but insulated therefrom except by way of said electrical connection.

The anode may be mounted on or retained within a support of a more rigid material having little or no electrolytic action with the material of the anode under cold water conditions. In the case of zinc anodes the support may be of stainless steel which remains anodic to copper due to the configuration of the device and the cold water operating conditions.

Said electrical circuit may be adapted to enable an external electrical potential to be applied across the circuit to cause an externally generated current to pass through the cell. The circuit may be provided with means for adjusting the current passing through the cell and for monitoring the performance of the device.

Preferably means is provided to ensure that an adequate concentration of released zinc species is maintained in the water passing through the device. In passive forms of the device, that is where no external electrical potential is applied, such control may be effected by maintaining substantially constant the ratio of the surface area of the anode to the average maximum flow rate of water through the device for different sizes of device adapted to different operating conditions. Preferably the ratio of surface area in square centimetres to average maximum flow rate in litres per minute is between 1.55 and 1.75, and preferably approximately 1.65.

In a further modification the device incorporates a region of high magnetic field disposed downstream of said anode and cathode. Thus the invention also provides a device for treating hard water to counter the deposition of scale comprising means for causing release of electrically charged particles and ions of random orientation into water flowing through the device to act as sites for formation of crystals of scale forming impurities in suspension in the water and means downstream thereof for generating a magnetic field through which said particles and ions pass during their travel through the device in suspension in the water, whereby to accelerate orientation of the particles and assist coagulation and crystal formation, thereby reducing deposition of scale on the surfaces of vessels, pipes or the like into or through which the water subsequently flows.

Said means for causing release of particles and ions preferably comprises a sacrificial anode incorporated in an electrical circuit with a cathode and the water as electrolyte.

Said means for generating a magnetic field preferably comprises a permanent magnet the poles of which define a passage for water passing through the device and which generates a magnetic field of 10,000 gauss or greater.

Embodiments of the invention will now be described, by way of example only, with reference to the accompanying diagramatic drawings, in which:

FIG. 1 is an external side elevation of one form of device according to the invention;

FIG. 2 is an enlarged vertical cross-section through one end of the device shown in FIG. 1;

FIG. 3 is a cross-section on the line III—III in FIG. 2;

FIG. 8 is a side view of a magnetic element incorporated in the device of FIG. 7;

FIG. 9 is a view in the direction of arrow A in FIG. 8;

FIG. 10 is a section on the line X—X in FIG. 8; and

FIG. 11 is a view in the direction of arrow B in FIG. 8.

Figure 4:
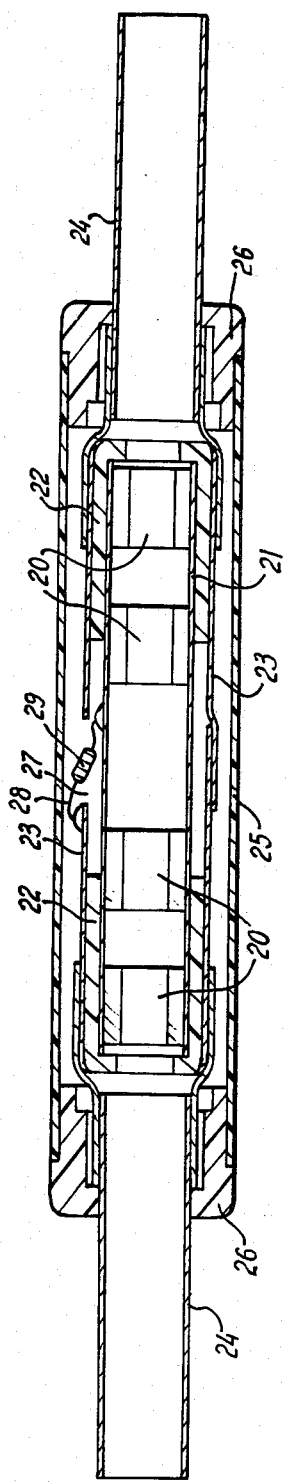
FIG. 4 is a vertical cross-section through an alternative form of device.

Referring to FIGS. 1 to 3, the device comprises an outer casing 5 of plastics or other electrically insulating material from the opposite ends of which copper connectors 6 project for connection to a section of pipe in which the device is to be fitted. The copper connectors 6 are supported in end plugs 7 of plastics or other electrically insulating material and are connected at their inner ends through copper end plates 8 to a section 9 of copper tube located within and spaced from the outer casing 5 of the device.

Mounted within each end of the copper tube 9 is a support member 10 in the form of a cradle of plastic or other electrically insulating material incorpoating openings 10A (FIG. 3) through which liquid may flow and having a central aperture 11 (FIG. 3) through which a stainless steel rod 12 extends and is secured at each end by nuts 13 also of stainless steel. Mounted on the steel rod 12 is a bar 14 of high purity zinc preferably in excess of 99% pure and advantageously 99.99% pure. The bar 14 is of castellated form in order to present a substantial surface area to liquid flowing through the device in use which passes between the bar 14 and the inner surface of the copper tube 9. Longitudinal movement of the assembly consisting of the stainless steel rod 12, zinc bar 14 and support devices 10 is prevented by spacer members 15 of plastics or other electrically insulating material interposed between the end plates 8 and the support members 10.

One of the copper end connectors 6 is electrically connected to the stainless steel rod 12 by means of an electrical circuit 16 incorporating a resistor 17 and passing through the associated end plate 8 by means of an insulated connector 18. Electrical connection to the zinc anode is achieved by arranging for the latter to be a tight push fit on the rod 12. This also ensures there is no gap between the anode and the rod 12 which might give rise to corrosion in use. In addition the close contact between the zinc and the stainless steel ensures that the latter cannot become cathodic after a period of use as can occur using stainless steel alone. The resistor controls and stabilizes the current flow in the circuit and is preferably a 0.5 watt resistor of 500 ohms or greater.

In operation the device is inserted into a supply conduit of, for example, a water system. As the connecting members 6 and tube 9 on the one hand and the castellated bar 14 on the other hand are formed from different metals, a potential difference exists between them due to their different positions on the galvanic scale. When liquid passes through the device it forms a conducting path allowing current to flow round the circuit formed by the wire 16. The liquid passing through the device is therefore subjected to a self-induced electric field which affects the electrical potential of the suspended particles in the liquid and counters the deposition of scale.

Figure 5:
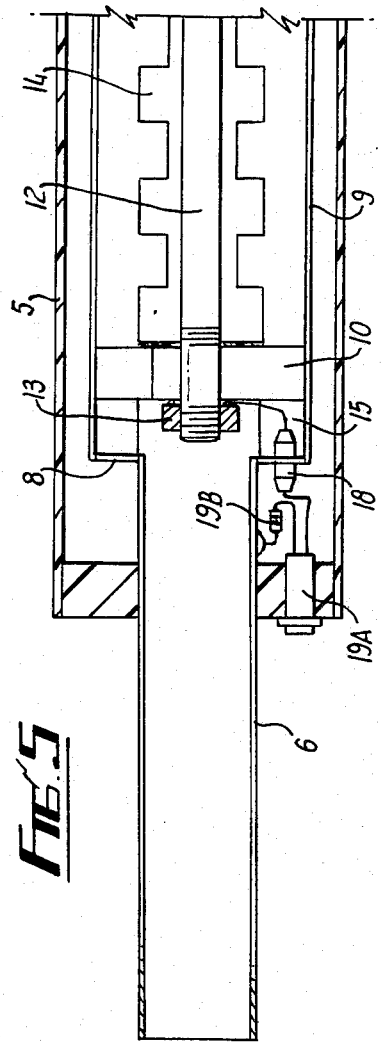
FIG. 5 is an enlarged detail view showing a modification.

Visual indication of correct operation may be provided by replacing the resistor 17 with a miniature moving coil ammeter 19A and associated resistor 19B as shown in FIG. 5, such that the total resistance of the ammeter plus resistor is 500 ohms or greater and the ammeter registers a significant fraction of full scale deflection when the device is operating normally. Any variation in the operating conditions, particularly a reduction or interruption of the action of the electrolytic current consuming cell, is indicated by a change in the ammeter deflection.

FIG. 4 shows an alternative form of device in which the zinc bar of the FIGS. 1 to 3 arrangement is replaced by a plurality of rings 20 of zinc which are a tight push fit within a stainless steel support tube 21. The tube 21 is surrounded at each end by a bush 22 of nylon or other electrically insulating material which is mounted in turn within a copper tube 23 connected to copper end connectors 24 similar to those shown in FIGS. 1 and 2. The device is enclosed in a tubular outer casing 25 of plastics material fitted with electrically insulating end caps 26.

A section of the copper tube 23 is cut away to form an opening 27 through which passes a wire 28 incorporating a resistor 29. The opposite ends of the wire are connected to the tubes 21 and 23 thus forming an electrical connection between the copper tube 23 which acts as the cathode and the steel tube 21 and hence the zinc rings 20 which act as the anode. It has been found that the zinc maintains the stainless steel in an anodic mode. The device of FIG. 4 may also be modified in the manner shown in FIG. 5 if desired. The device of FIGS. 2 and 3 is more suited to applications where higher flow rates are involved and greater anode surface areas are required.

It has been found desirable to maintain an optimum ratio between the surface area of the anode and the flow rate of liquid through the device. In practice devices will be constructed in a range of sizes to suit different applications and it has been found that best results are attained if the ratio of surface area in square centimetres to average maximum flow rate in litres per minute is between 1.55 and 1.75 and preferably around 1.65. This ensures that an adequate concentration of released zinc particles is maintained in the water flowing through the device to form sites available for crystal growth in the water. By construction of a suitable range of devices of different size the optimum ratio may be achieved over the full range of flow rates encountered in practice.

The embodiments of the device described above are passive electrolytic devices, that is, no external power source is required for the electrolytic action, the current flow deriving from electrical potential generated by chemical reaction at the surface of the electrodes. The effectiveness of such a device and its performance depend on the structure and condition of the electrodes and the water passing through the device and no control of the operation of the device is possible. In industrial applications there are advantages to be gained by exerting a more direct control over the electrolytic release of zinc from the anode and this can be done by applying an external potential across the electrochemical cell, and "driving" the chemical reaction at the electrode surface. By this means it becomes possible to precisely control the operation of the device independent of the conditions of the electrode surface and the water supply. By incorporation of suitable control means the device may be adjusted to cope with variation in conditions or build-up of coating on the electrode surfaces without ceasing to function.

Figure 6:
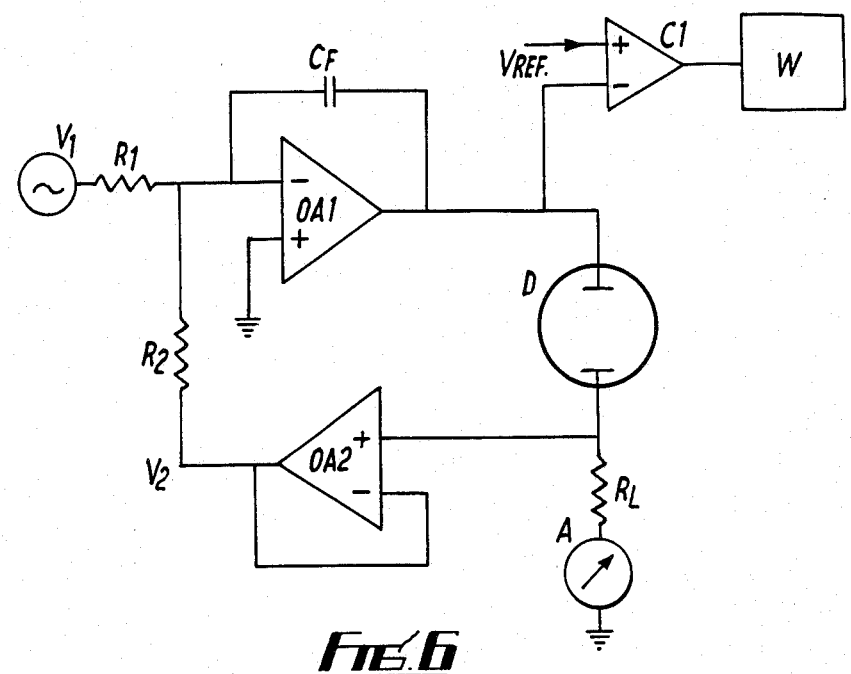
FIG. 6 is a diagram of an electrical control circuit incorporated in an alternative form of device.

FIG. 6 shows a control circuit employing feedback to ensure that a constant current passes through the electrolytic cell device which is indicated at D. The main part of the circuit comprises two operational amplifiers OA1 and OA2 with associated resistors $R_1$, $R_2$ and $R_L$. Amplifier OA1 acts to polarise the anode such that an electrolytic current passes between the anode and the cathode. This current is also passed through the load resistor $R_L$, and gives rise to a potential drop across the resistor.

The potential at the cell end of the load resistor $R_L$ thus depends on the current flowing through the cell. This potential is measured by amplifiere OA2, which is an operational amplifier arranged as a unity gain buffer. The feedback loop is completed by resistors $R_1$ and $R_2$ which form the summing mode of amplifier OA1.

Arranged in such a feedback system the circuit operates such that the potential difference between the two inputs of amplifier OA1 is zero. Since the positive input is grounded, the negative input must also be at ground potential, which implies that the currents flowing through the two resistors of the summing mode are equal and opposite. Since the potential $V_2$ is dependent on the current flowing through the cell, the current can be controlled by adjusting $V_1$. Variation of input voltage $V_1$ will allow the current to be set over a wide range. The polarisation potential applied to the cell by amplifier OA1 may thus be varied to take account of any variations in electrode condition or water characteristics. A feedback capacitor $C_F$ is connected across amplifier OA1 to stabilise the response of the circuit and prevent oscillations. The actual current flowing will be monitored by an ammeter or a voltmeter module A. The resitance $R_L$ is the total resistance between the electrode and ground.

The performance of the circuit may be monitored using a comparator amplifier. This has the property that the voltage at the output changes state when the potential at one input changes from being less than the other input to greater than the other input. Failure of the circuit would be indicated by the output of amplifier OA1 going to maximum output voltage in an attempt to maintain current through the cell. By applying a reference potential $V_{REF}$ to one input which is slightly lower than the maximum output of amplifier OA1, if a failure occurs and amplifier OA1 goes to maximum output voltage, then the output of capacitor C1 will change state causing a visual and/or audible alarm W to be triggered.

This control circuit will cope with such faults as:
(1) No water in cell.
(2) Failure of contacts to electrodes.
(3) Exhaustion of electrodes.
(4) Development of an impervious coating on the electrodes.

In use, the circuit would be connected between points 16 and 15 in FIG. 2, replacing the resistor 17.

It should be appreciated that the precise manner in which the mechanism of the present invention operates is not fully understood. It is clear however that the self-induced or externally generated current alters the electrical potential of the particles suspended in the liquid, and this is believed to initiate the formation of a quantity of embryonic crystals or nuclei in the liquid at the region of application of the device to the pipe. These embryonic crystals or nuclei immediately begin to interact with the scale salts, thereby inhibiting their natural tendency to form encrustations, and are then swept along by the flow of the liquid and when the liquid enters a boiler, pipe or container they form the nuclei for further growth of insoluble carbonate and other impurities. Thus as well as forming on the surfaces of the pipe, container or the like, the carbonate crystals form round the suspended nuclei which present surface areas for crystal growth in the liquid.

The total amount of crystal growth is thought to remain the same as in untreated liquid, but as a substantial proportion is in the form of suspended precipitate carried in the liquid it is withdrawn from the system with the liquid and as a result the scale formed on the internal surfaces of the system is reduced. The device acts as an electrolytic cell with the water flowing through the device acting as the electrolyte.

The zinc anode is sacrificial and gives off minute particles of zinc oxide and zinc hydroxide at a controlled rate. These particles are substantially non-adherent to the anode, remain in suspension in the water and are carried out of the device by the water flow. They thus form sites for crystallization or coagulation of the impurities in the water, inhibiting scale formation on the surfaces of the pipe, container or the like. Thus in addition to modification of the electrical potential of the particles in the water by virtue of the induced current, scale formation is reduced by virtue of association of calcium particles in the water with zinc oxide and zinc hydroxide particles released by the electrochemical action of the cell.

The performance of the device may be improved by passage of the treated water emanating from the device through a region of high magnetic field.

The field is preferably produced by a permanent magnet arranged such that its two poles define a passage for water passing through the device, and the magnetic field between the two poles is preferably 10,000 gauss or greater. Particles released by the anode of the electrolytic cell device form nucleation sites in the water for treatment by the magnetic field.

Figure 7:
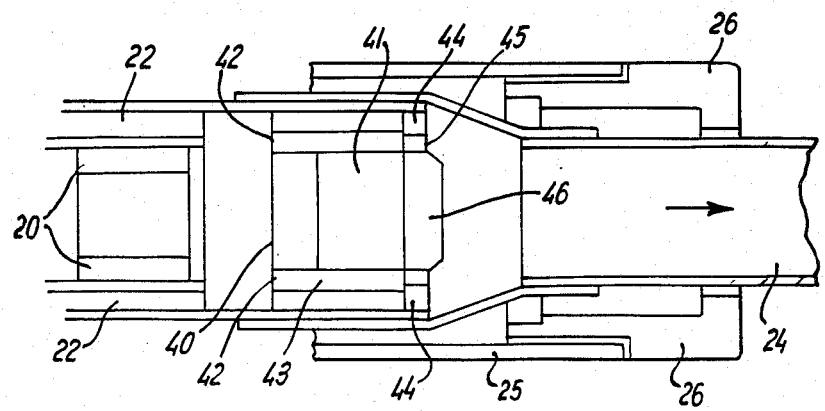
FIG. 7 is a fragmentary cross-section through a modified form of device.

FIGS. 7 to 11 show a form of magnetic device which may be incorporated at the downstream end of an electrolytic cell device. In FIG. 7 the magnetic device is incorporated in a device of the kind shown in FIG. 4 in which the anode comprises a plurality of zinc rings 20 through which the water to be treated flows to a copper outlet pipe 24. Before entering the pipe 24 the treated water passes through the magnetic device which comprises a mild steel body acting both as a return circuit and as a housing 40 enclosing a cylindrical magnet 41. Water enters the housing through an arcuate slot 42 of proportional area to the supply pipe and may pass around the sides of the magnet through a passage-way 43 and leave by way of an annular outlet slot 45. This is of the same area as the slot 42 but of narrower width, preferably around 1.7 mm., in order to subject the water to a magnetic field of some 10,000 gauss between mild steel pole pieces 46 and 44. The inlet slot 42 may be replaced by a plurality of arcuate slots or a series of annularly arranged holes if desired. The entire assembly is coated with a thin layer of a non-magnetic corrosion protection material.

Devices of the kind described inserted in a supply pipe are found to induce coagulation of the colloid or other particles and ions in the liquid. When hard water is treated in this way the tendency to form scale deposits on the inner surfaces of conduits and containers is reduced. When used on small to medium sized domestic water supply systems a single device fitted to the lead-in pipe will be effective throughout the system. Extra devices may however be required in some cases and in the case of industrial applications.

Various modifications may be made without departing from the invention. For example the internal construction of the device may be modified and different materials meeting the criteria referred to above may be employed. The additional magnetic treatment may be omitted if desired or may be effected by a self-contained magnetic device arranged to be fitted in the supply pipe downstream of the electrolytic device. The various monitoring and control means referred to may also be omitted if desired. Moreover while reference has been made herein and in the appended claims to the treatment of water, the invention is also applicable to the treatment of other liquids including, for example, fuel oil.

I claim:

1. A device for treating hard water to counter the deposition of scale comprising an anode and a cathode spaced apart to define a passage through which water to be treated passes during operation of the device, said anode and cathode being connected in an electrical circuit externally of the water and including the water as an electrolyte, the anode being formed from zinc and the cathode from copper whereby in operation electrolytic action takes place releasing electrically charged ions into the water which affect the stability of scale-forming particles contained in the water and particles of amphoteric zinc oxide and hydroxide are released from the anode forming sites in the water for formation of crystals of scale forming impurities which remain in suspension in the water thereby reducing deposition of scale on the surfaces of vessels, pipes or the like into or through which the water subsequently flows.

2. A device according to claim 1 wherein said anode is in excess of 99% pure.

3. A device according to claim 1 wherein said anode has a mass loss rate of less than $10 \times 10^{-6}$ grammes per hour.

4. A device according to claim 1 wherein said anode comprises a series of rings spaced apart axially of the device and defining a central passage for flow of water therethrough, the cathode comprising a tube surrounding said rings but electrically insulated therefrom other than by way of said external electrical circuit.

5. A device according to claim 1 wherein said anode comprises a bar of castellated form around which the water flows during its passage through the device, the castellated bar presenting a substantial surface area to the water and the cathode comprising a tube surrounding said bar but insulated therefrom except by way of said external electrical circuit.

6. A device according to claim 1 wherein the ratio of the surface area of said anode in square centimetres to the average maximum flow rate of water through the device in litres per minute is between 1.55 and 1.75.

7. A device according to claim 1 wherein said anode is mounted on or retained within a support of a more rigid material having little or no electrolytic action with the material of the anode under cold water conditions.

8. A device according to claim 7 wherein said support is of stainless steel.

9. A device according to claim 1 wherein said electrical circuit includes an external source of electrical potential to cause an externally generated current to pass through the device.

10. A device according to claim 9 wherein said circuit incorporates means for adjusting the current passing through the device to vary the release of particles from the anode during operation.

11. A device according to claim 1 including means for sensing and indicating current flow through the device.

12. A device according to claim 1 including means for generating a magnetic field downstream of said anode and cathode.

13. A device for treating hard water to counter the deposition of scale comprising means for causing introduction of salt particles and ions of random orientation into water flowing through the device to act as sites for formation of crystals of scale forming impurities in suspension in the water, and means for generating a magnetic field through which the water passes during its travel through the device, whereby to accelerate orientation of the particles and assist coagulation and crystal formation, thereby reducing deposition of scale on the surfaces of vessels, pipes or the like into or through which the water subsequently flows.

14. A device according to claim 13 wherein said means for generating said magnetic field comprises a permanent magnet the poles of which define a passage for water passing through the device.

15. A device according to claim 14 wherein said magnetic field has a field strength of not less than 10,000 gauss.

16. A device according to claim 13 wherein said means for introducing said salt particles comprises a zinc anode incorporated in an electrical circuit with a copper cathode and the water as electrolyte.

* * * * *